Figure 1:
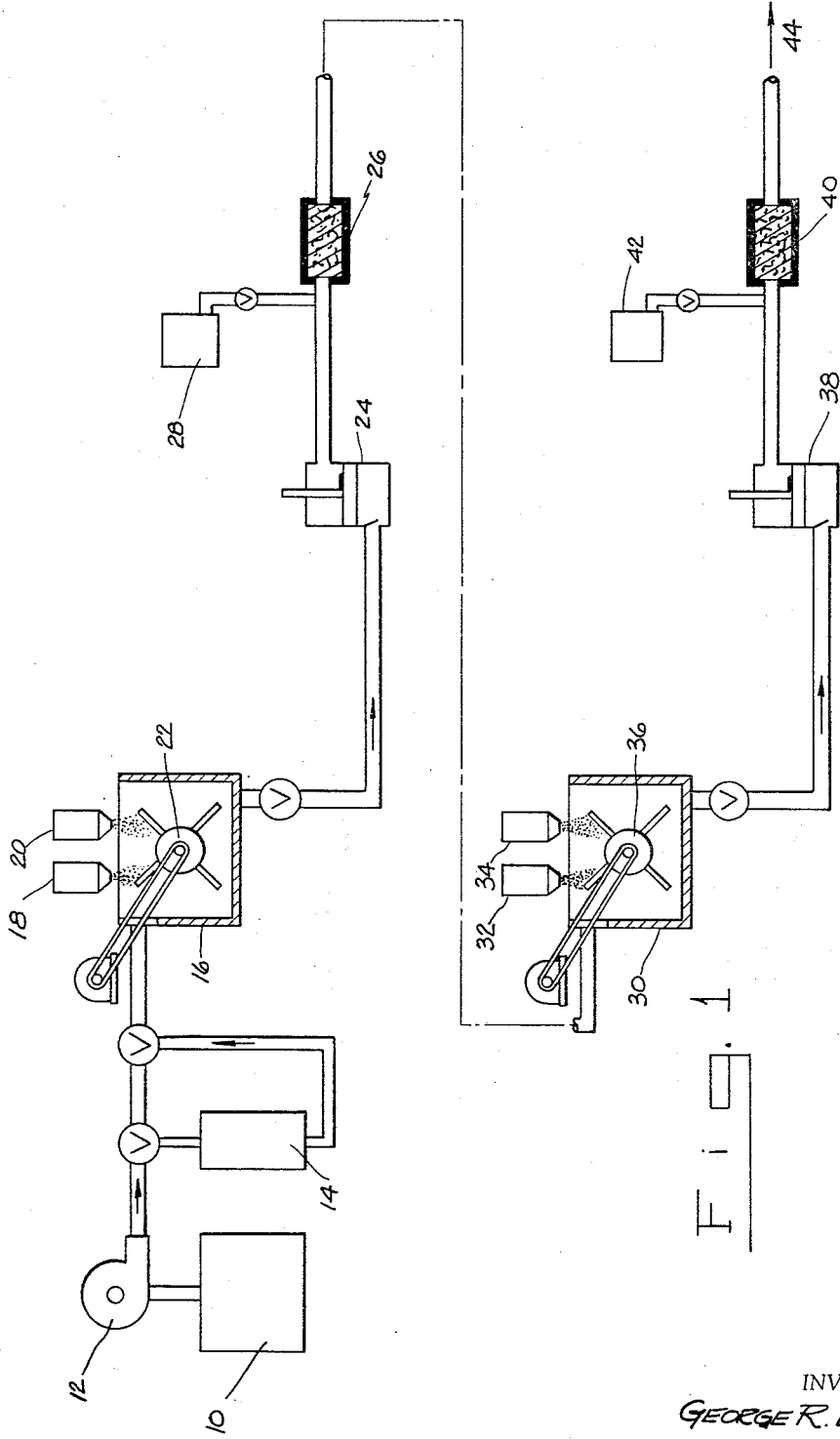

Sept. 5, 1967  G. R. BELL  3,340,187
PROCESS OF REMOVING MANGANESE FROM WATER
AND ADDITIVE FOR USE THEREIN
Filed June 3, 1963

INVENTOR.
GEORGE R. BELL
BY
John R. McKinney
ATTORNEY

3,340,187
PROCESS OF REMOVING MANGANESE FROM WATER AND ADDITIVE FOR USE THEREIN
George R. Bell, Martinsville, N.J., assignor to Johns-Manville Corporation, New York, N.Y., a corporation of New York
Filed June 3, 1963, Ser. No. 284,981
11 Claims. (Cl. 210—51)

This invention relates to the removal of manganese as a contaminant from water sources, and particularly to novel filter and filtration techniques for effectively achieving such removal. More specifically, this invention relates to preconditioning of both ground and surface water to remove soluble manganese by means of a simple filter aid filtration system. Removal of soluble iron compounds will also be achieved by the instant process.

Manganese as found in water supplies is generally in association with iron, and where found, presents a difficult removal problem. It can be removed to some extent by ion exchange, aeration and slow sand filtration, and by conventional flocculation and rapid sand filtration. Such processes are expensive, however, and may be cumbersome and ineffective.

Rapid sand filters have little inherent clarifying capacity of themselves, as the suspended matter therein has to be pretreated to collect or coalesce into sufficiently large agglomerates so as to settle out and be substantially removed in advance of the sand filter. Almost never has the unpretreated water been filtered through rapid sand filters. It is commonly understood in water works practice that sand filter plants include the pretreatment works which are substantially larger and more expensive than the sand filter structures themselves.

While the above might be termed the traditional approach to water filtration, technologies used by other industries are presently being adapted to water clarification. Specifically, the principle of filter aid filtration, which has demonstrated many advantages in other fields, has shown significant economic and technological advances in water clarification.

This technique involves the incorporation in the liquid to be filtered of a small amount of finely divided particulate material, the filter aid, which functions to form continuously a porous cake upon the filtering surface and to entrap impurities by various mechanisms. The materials most generally used as filter aids are siliceous materials such as diatomaceous silica and perlite, carbon, and fibrous matter such as asbestos and cellulose, and the properties of these materials, e.g., porosity, diversity of shape, incompressibility, etc., make them unique for this purpose. A particularly important feature of filter aid filtration is the fine porosity of the filter aid cake which enables the removal of substantial portions of the suspended particles.

In order to increase the efficiency of the filtration process, a precoat of filter aid particles may be provided on the filter septum in addition to incorporating the particles within the filter feed. This keeps the main filter cake containing the impurities from coming into direct contact with the filter medium and consequently prevents the gummy particles from clogging the medium and lessening the filtration efficiency.

The several processes available for removal of iron and manganese from water supplies, remove iron to a high degree but are frequently less effective for manganese removal. All of these processes have had the disadvantage of high capital and operational costs.

Recently, diatomaceous silica filter aid filtration systems utilizing the principle of preconditioning the filter feed, as opposed to pretreating the filter feed, were found to be effective for iron, and nominal amounts of manganese, removal, but were found to be ineffective to remove high concentrations of manganese. The ineffectiveness has been traced to the effect on the precipitated iron of the severe treatment required to remove manganese. That is, it was determined that an oxidant such as $KMnO_4$ added to the process to assist in manganese removal, oxidizes the iron present to a difficult-to-filter ferric hydroxide state, which is detrimental to the filtration of both the iron and manganese.

It is therefore a principal object of this invention to provide a filter aid filtration process which will overcome the above-mentioned disadvantages while providing an efficient and effective means to remove manganese and other impurities from water.

Another object of this invention is to provide a filter aid composition which is inexpensive and provides an effective and ready means for reducing manganese to an acceptable level in water supplies.

It is a further object of this invention to provide a novel and more practical method of treating commercial filter aids to increase their effectiveness to remove manganese from water supplies.

It is another object of this invention to provide a practical filter aid filtration technique for purifying manganese contaminated water sources to acceptable manganese concentrations and thereby render them useful for potable and sensitive industrial purposes.

Other objects and further scope of applicability of the present invention will become apparent from the detailed description given hereinafter, a representative embodiment of which has been illustrated in the accompanying drawing by way of example only wherein:

FIGURE 1 is a schematic view of a preconditioning and filtration equipment train useful in carrying out the instant invention.

It has now been determined that the foregoing objects may be satisfied and the above-mentioned problems overcome by providing a novel method of treating the manganese, and associated iron, contaminated water supply.

As noted above, it has been shown that when a strong oxidant such as $KMnO_4$ is used in a filtration process to assist in manganese removal, iron, if present in quantity, is oxidized to ferric hydroxide which deleteriously affects the filtration of both iron and manganese.

It has been found that with iron removed or reduced to a low concentration, a filter aid filtration process with suitable preconditioning utilizing filter aid, alkali and a strong oxidant, can effectively reduce manganese to low levels with low capital and operating expenses. The iron concentration may be effectively removed by utilizing new concepts of preconditioning with subsequent filter aid filtration. These techniques are more fully explained in U.S. Letters Patent application Ser. No. 249,782, filed Jan. 7, 1963, and Serial No. 284,884, filed June 3, 1963, both assigned to the instant assignee. For purposes of this disclosure, the latter technique has been used in conjunction with the manganese removal process of the instant invention.

Briefly, the iron and manganese containing water is first treated with an appropriate alkali or mixture of alkalis to impart to the water a pH of between about 7 and 10. The alkali is so selected as to be a slow reacting material, e.g., $Na_2CO_3$, $CaO$, $Ca(OH)_2$, and the addition controlled so as to attain a stable pH with controlled agitation. Filter aid is added along with the alkali and the resulting preconditioned water filtered to remove the iron without prior settling. Once having removed the iron, or at least reducing it to a workable level, the manganese concentration may be reduced to about 0.05 p.p.m., or lower, by a similar preconditioning technique.

For instance, with a detention time of less than 10 minutes in the preconditioning tank at pH values of about 8.6 obtained by adding $Na_2CO_3$, filtration preconditioned water containing 1 p.p.m. of $KMnO_4$ and 20 p.p.m. filter aid, reduced an initial manganese content of 1.5 p.p.m. to less than 0.05 p.p.m. with a filter cycle of more than 12 hours and nominal head loss rate.

With continuing reference to the accompanying drawing, this invention may be utilized in the following manner. Water is drawn from a source such as a well 10, by a centrifugal pump 12 and passed to an aerating tower 14 or alternatively directly into a preconditioning tank 16. If the water is first passed to the aerating tower it is then discharged into the preconditioning tank. Two feeding devices, 18 and 20, are mounted above the tank 16 and discharge the alkali and filter aid, respectively, to assist in the removal of the iron. Upon addition of the chemical and filter aid to the tank, the contents are retained under agitation, as by agitator 22, for between 5 and 15 minutes. The preconditioned water is then pumped by pump 24 to a commercial filter unit 26 with sufficient pressure to overcome both the resistance of the filter itself and the gradually increasing resistance of the accumulating filter cake. The filter is provided with a precoat supply means 28, to feed precoat filter aid to the filter. The filtration rate is controlled at 25 g.p.m. or 1 gallon per square foot per minute (g.s.f.m.). This technique is that decsribed in the above-cited patent application Ser. No. 284,884.

To remove the manganese, the filtered water is pumped to a second preconditioning tank 30. This tank is similarly equipped with two feeding devices, 32 and 34, for the discharge filter aid and oxidant, such as potassium permanganate. Agitation is effected by means of agitator 36 for a detention time of between 9 and 15 minutes. The preconditioned water is then pumped by means of pump 38 to a commercial filter 40, which is also provided with a precoat supply means 42 to feed precoat filter aid to the filter. A similar filtration rate is used. From the filter the water is passed to end use 44.

If the water source contains a low initial concentration of iron e.g. less than 1–2 p.p.m., then the water may be directly treated to remove the manganese, and iron, by direct introduction into the second preconditioning tank where the alkali may be added along with the filter aid and oxidant.

The exact nature and amounts of alkali used varies accordingly to the amount of iron contaminate and the desired final amount of the iron. However, it has been found that amounts between 2.5 and 60 parts per million are generally sufficient to provide a pH of between about 7.0 and about 10 and to reduce the iron concentration to or below the recommended drinking water standards of the United States Public Health Services. By alkali it is meant the choice of alkali material is such as to be water soluble and to produce a filterable hydrate. It has been found that this group of materials consists of alkali metal and alkaline earth metal carbonates, e.g., $Na_2CO_3$, alkaline earth metal hydroxides, e.g., $Ca(OH)_2$, alkaline earth metal oxides, e.g., CaO, alkali metal aluminates, alkali metal ferrates and mixtures thereof. As noted above and further illustrated in the examples below, the precipitation of ferric hydroxide results in an unfilterable suspension. The resulting iron hydroxide of the instant process is difficult to define, but it is not a ferric hydroxide but rather a family of filterable iron oxide and more fully described in the U.S. Geological Survey-Water Supply Paper No. 1549–A, by J. D. Men and W. H. Cropper (1959), entitled, "Survey of Ferrous-Ferric Chemical Equilibra and Redox Potentials."

The oxidant is selected from the group consisting of potassium permanganate, hydrogen and alkali metal peroxide, hydrogen and alkali metal persulfates, hydrogen and alkali metal perborates, chlorine, chlorine dioxide and ozone, with potassium permanganate being preferred. It is used in an amount between 0.2 and 25.0 p.p.m., with between 0.25 and 10 being preferred. It is to be recognized that the actual amount used is dependent on the water being treated and the oxidant selected.

The filter aid used in the body feed and precoat feed may be any one of the commercially available filter aids such as the diatomaceous silica, expanded perlite, fibers, or other filter aids, or mixtures of the same. The amount of filter aid added as body feed is likewise dictated by the liquid being treated and the desired result. However, it has been found that between 10 and 100 parts per million of body feed is generally satisfactory with the above-described amount of alkali. It is to be noted that rather than add the alkali, oxidant, and filter aid separately as described above, the three may be precombined and added as a mixture.

A more complete understanding of the invention will become apparent from the following examples. In all cases the filtration rate was controlled at one gallon per square foot per minute (g.s.f.m.) as a matter of convenience and all proportions are given as parts per million.

EXAMPLE I

A double preconditioning system as described above was used to treat a well water containing 3.6 p.p.m. iron and 1.2 p.p.m. manganese. In accordance with the technique of the above-described copending application, the well water was first aerated to remove $CO_2$ and the pH adjusted to 8.3–8.4 in the first preconditioning tank with powdered hydrated lime. Experience has shown that with the addition of filter aid a high degree of iron removal can be obtained at this point but manganese removal is inadequate. Without filtering the thus preconditioned water was transferred to a second tank where 60 p.p.m. of an intermediate flow rate diatomaceous silica filter aid and 1.0 p.p.m. $KMnO_4$ were added. Detention in the first tank was about 10 minutes and in the second tank about 5 minutes. The water from the second tank was filtered using a precoated filter and the resultant filtered water contained 0.01 p.p.m. iron and manganese ranged from 0.12 to 0.28 p.p.m. The rate of head loss increase was 5.3 p.s.i. per hour.

This evidenced that the strong oxidant $KMnO_4$ substantially affected the form of the iron to render it less filterable as measured by the high rate of head loss increase.

EXAMPLE II

Using the equipment train described above, 25 g.p.m. of a well water in which the iron was reduced to 0.1 p.p.m. by filtering after the first precondition step described in Example I and containing 1.0 to 1.2 p.p.m. manganese was continuously preconditioned for 10 minutes with 1 p.p.m. $KMnO_4$, 20 p.p.m. of a fast flow rate diatomaceous silica filter aid and sufficient soda ash to adjust the pH in the tank to about 9.0. The preconditioned water was then filtered through a commercial filter at 1 g.s.f.m. The manganese content of filtered water was immediately reduced to 0.12 p.p.m. and subsequently to 0.03 p.p.m. Head loss was 1.4 p.s.i. per hour average for 10 hours at which point the cycle was voluntarily terminated.

EXAMPLE III

The same well water supply as Example II was treated in the same manner except that 2.0 p.p.m. $KMnO_4$ and 40 p.p.m. filter aid were added to the preconditioning tank. Soda ash was added to adjust the pH range to 8.6–8.7. The preconditioned water was filtered through a diatomaceous silica precoated filter aid filter. The 1.2 p.p.m. initial manganese concentration was reduced within 15 minutes to less than 0.02 p.p.m. and thereafter to less than measurable amounts for 8 hours during which the head loss increase was 1.1 p.s.i. per hour. The cycle, which could have continued many more hours, was voluntarily terminated.

EXAMPLE IV

Well water containing from 0.55 to 0.70 p.p.m. iron and 1.25 p.p.m. manganese was treated with 1.0 p.p.m. KMnO₄, 60 p.p.m. of a fast flow rate diatomaceous silica filter aid and sufficient soda ash to adjust the pH in the preconditioning tank to 8.9–9.1. Thirty gallons per minute were filtered using a gravity-vacuum filter aid filter and the filtered water was found to contain manganese ranging from 0.055 to 0.08 p.p.m. Iron in the same filtered water samples ranged from 0.03 p.p.m. to less than 0.01 p.p.m. Head loss increase averaged 2.5 in. Hg vacuum per hour.

EXAMPLE V

Using the same equipment train described above, the same well water supply as Example II was treated with 2.0 p.p.m. ammonium persulfate and 40 parts perlite filter aid in the preconditioning tank. Lime was added to fix the pH at about 7.5. After mixing for 6 minutes, the preconditioned water was filtered through a precoated filter. The manganese concentration was reduced to less than 0.05 p.p.m. with a filtration of 8 hours with a head loss increase of 1.1 p.s.i. per hour.

EXAMPLE VI

The same well water as Example II was treated with 5 p.p.m. chlorine and 40 p.p.m. diatomaceous silica filter aid. The pH was adjusted to about 8.0 by the addition of NaOH. The filtered water had a manganese concentration of less than 0.05 p.p.m. and a head loss rate cycle of 1.0 p.s.i. per hour for 10 hours.

EXAMPLE VII

Example VI was repeated using 2.5 p.p.m. of chlorine dioxide in place of the chlorine. The manganese concentration was reduced to less than 0.05 p.p.m. and the rate of head loss was less than 1.0 p.s.i. per hour for 12 hours.

It is believed the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

What I claim is:

1. A method of treating water containing a high concentration of manganese comprising, providing water having a total inorganic iron content of less than about 2 parts per million, preconditioning the water by mixing therewith prior to filtration, ingredients consisting essentially of (a) 10 to 100 parts pulverulent filter aid, (b) 2.5 to 60 parts water soluble alkali selected from the group consisting of alkali metal carbonates, alkaline earth metal carbonates, alkali metal hydroxides, alkaline earth metal oxides, alkali metal aluminates, alkali metal ferrates, and mixtures thereof to produce a pH in the water between 7 and 10 and (c) an oxidant selected from the group consisting of potassium permanganate, hydrogen peroxide, alkali metal peroxide, hydrogen persulfate, alkali metal persulfate, hydrogen perborate, alkali metal perborate, chlorine, chlorine dioxide and ozone, and subjecting the mixture containing water to filter aid filtration whereby the manganese concentration is reduced to below about 0.05 part per million with accompanying head loss rates of less than about 2 p.s.i. per hour.

2. A method of treating water having a manganese concentration greater than about 1 part per million comprising providing water having a total inorganic iron content of less than about 2 parts per million, preconditioning the water by mixing therewith prior to filtration, ingredients consisting essentially of (a) 10 to 100 parts pulverulent filter aid, (b) 2.5 to 60 parts water soluble alkali selected from the group consisting of alkali metal carbonates, alkaline earth metal carbonates, alkali metal hydroxides, alkaline earth metal oxides, alkali metal aluminates, alkali metal ferrates, and mixtures thereof to produce a pH in the water between 7 and 10, and (c) an oxidant selected from the group consisting of potassium permanganate hydrogen peroxide, alkali metal peroxide, hydrogen persulfate, alkali metal persulfate, hydrogen perborate, alkali metal perborate, chlorine, chlorine dioxide and ozone, and subjecting the mixture containing water to filter aid filtration whereby the manganese concentration is reduced to below about 0.05 part per million with accompanying head loss rates of less than about 2 p.s.i. per hour.

3. A method as defined in claim 2 wherein the ingredients are added to the water in the detention area and a mixture containing water is maintained in said detention area for between about 5 and about 15 minutes.

4. A method as defined in claim 1 wherein the alkali is sodium carbonate.

5. A method as defined in claim 1 wherein the alkali is calcium hydroxide.

6. A method as defined in claim 2 wherein the filter aid is selected from the group consisting of diatomaceous silica, perlite, and mixtures thereof.

7. A manganese removing additive for water clarification consisting of a mixture of about 10 to about 100 parts pulverulent filter aid selected from the group consisting of diatomaceous silica, perlite and mixtures thereof, 2.5 to 60 parts alkali selected from the group consisting of alkali metal carbonates, alkaline earth metal carbonates, alkali metal hydroxide, alkaline earth metal oxides, alkali metal aluminates, alkali metal ferrates, and mixtures thereof, and between about 0.2 and about 25 parts oxidant selected from a group consisting of potassium manganate, hydrogen peroxide, alkali metal peroxide, hydrogen persulfate, alkali metal persulfate, hydrogen perborate, alkali metal perborate, chlorine, chlorine dioxide, and ozone.

8. An additive as defined in claim 7 wherein the alkali is sodium carbonate.

9. An additive as defined in claim 7 wherein the alkali is calcium hydroxide.

10. An additive as defined in claim 7 wherein the oxidant is potassium permanganate.

11. An additive as defined in claim 7 wherein the oxidant is chlorine dioxide.

References Cited

"Diatomaceous-Earth Filtration in New York State," Fraser, Jour. AWWA, February 1954, vol. 46, pp. 151–159.

"Diatomite Filters for Municipal Installations," Baumann, Jour. AWWA, February 1957, vol. 49, pp. 174–186.

"Diatomite Filtration for Removal of Iron and Manganese," Coogan, Jour. AWWA, December 1962, vol. 54, pp. 1507–1517, effective date June 19, 1962.

"Significance and Removal of Manganese in Water Supplies," Griffin, Jour. AWWA, October 1960, vol. 52, pp. 1326–1334.

MORRIS O. WOLK, *Primary Examiner.*